United States Patent [19]
Craig

[11] Patent Number: 6,101,186
[45] Date of Patent: *Aug. 8, 2000

[54] METHOD AND SYSTEM FOR ORGANIZING DATA IN A RELATIONAL DATABASE

[75] Inventor: Michael S. Craig, Hoboken, N.J.

[73] Assignee: Lucent Technologies, Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/777,988

[22] Filed: Dec. 24, 1996

[51] Int. Cl.[7] .............................. H04L 12/28; G06F 17/30
[52] U.S. Cl. ............................................. 370/394; 707/102
[58] Field of Search ..................................... 370/252, 428, 370/320, 912, 329, 335, 342, 902, 394, 913; 455/517, 561; 707/10, 104, 102; 375/200

[56] References Cited

U.S. PATENT DOCUMENTS

| | | | |
|---|---|---|---|
| 5,390,173 | 2/1995 | Spinney et al. | 370/393 |
| 5,434,971 | 7/1995 | Lysakowski, Jr. | 395/200 |
| 5,551,028 | 8/1996 | Voll et al. | 395/600 |
| 5,629,955 | 5/1997 | McDonough | 375/200 |
| 5,648,970 | 7/1997 | Kapoor | 370/394 |
| 5,732,077 | 3/1998 | Whitehead | 370/913 |

*Primary Examiner*—Huy D. Vu
*Assistant Examiner*—Chiho A. Lee
*Attorney, Agent, or Firm*—Synnestvedt & Lechner LLP

[57] ABSTRACT

A method, apparatus and system are disclosed for organizing data packets in a relational database based on data events. As used herein, a data event has an event start time, an event stop time, and one or more event data indicators. In a process embodiment of the invention, a data packet is read to determine its start time, its stop time, and each of its data indicators. The data packet is then inserted into a particular data event in the relational database if each of the packet's data indicators matches each data indicator of the particular data event, and if the difference between either the event's stop time and the packet's start time or the packet's stop time and the event's start time does not exceed a certain limit. Otherwise, the data packet is added as a new event in the relational database.

17 Claims, 3 Drawing Sheets

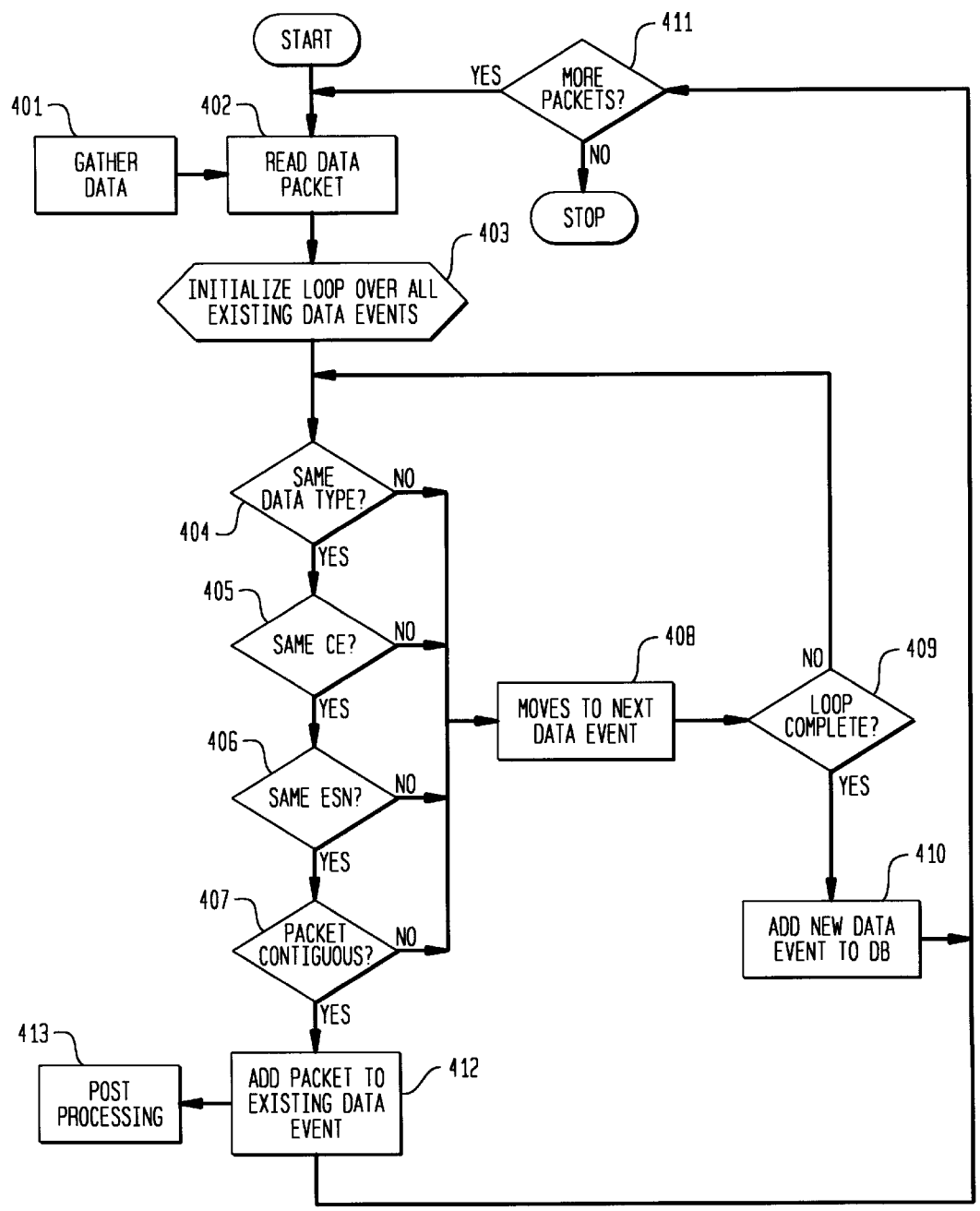

6,101,186

METHOD AND SYSTEM FOR ORGANIZING DATA IN A RELATIONAL DATABASE

TECHNICAL FIELD

The present invention generally relates to information management. More specifically, the invention relates to a system and process for organizing data packets in a relational database based on data events.

BACKGROUND OF THE INVENTION

In many applications, data are gathered en masse for subsequent analysis. The data gathered may relate to concurrent measurements which are downloaded and stored in a serial file. Because the data are generated in parallel but stored in series, data from one measurement frequently are interposed between data from another measurement. This poses a problem for subsequent analysis of the data, especially since the serial files tend to be very large. Searching and extracting information is performed in a piecemeal fashion which increases computation time and limits analysis. Therefore, a need exists for organizing data contained in such files to increase analysis capability and efficiency. The present invention fulfills this need among others.

SUMMARY OF THE PRESENT INVENTION

The present invention relates to a method and system for organizing data packets in a relational database based on data events. As used herein, a data event has an event start time, an event stop time, and one or more event data indicators. In a process embodiment of the invention, a data packet is read to determine its start time, its stop time, and each of its data indicators. The data packet is then inserted into a particular data event in the relational database if each of the packet's data indicators matches each data indicator of the particular data event, and if the difference between either the event's stop time and the packet's start time or the packet's stop time and the event's start time does not exceed a certain limit. Otherwise, the data packet is added as a new event in the relational database.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

FIG. 4 shows one preferred embodiment of the process for organizing data from the CDMA system of FIG. 3.

DETAILED DESCRIPTION OF THE PRESENT INVENTION

The present invention relates to a method, apparatus, and system for organizing data packets in a relational database based on data events. Organizing data in this fashion improves the data's post processing by using relational database technology to extract a complete and contiguous set of data of a given type quickly and efficiently. The invention may be practiced in any situation where data are accumulated in the form of data packets.

As used herein, the term "data packet" broadly refers to a packetized segment of continuous data having one or more data identifiers and a start and stop time. Data identifiers define one data packet from another aside from their start and stop times. The number of data identifiers for a data packet depends upon the number of variables affecting the data not including start and stop times. For example, if two meters (e.g., A and B) are used to measure two types of data (e.g., voltage and resistance), then two data identifiers are needed to particularly identify each possible permutation of data (e.g., A & voltage, A & resistance, B & voltage, and B & resistance). It should be noted that data identifiers are irrespective of time. Data packets having different data identifiers may be obtained concurrently with other data packets, and likewise, data packets having the same data identifiers may be obtained at different times. It is not possible, however, for data packets having the same data identifiers to be obtained concurrently.

The term "data event" as used herein broadly refers to data having the same data identifiers and being substantially contiguous in time. Such data may be a combination of multiple data packets. For data to be substantially contiguous in time in this context, the difference between the stop time of one data packet and the start time of another should be less than a predetermined period. In other words, the time gap between packets having like identifiers should be within a certain limit.

Figure 1:
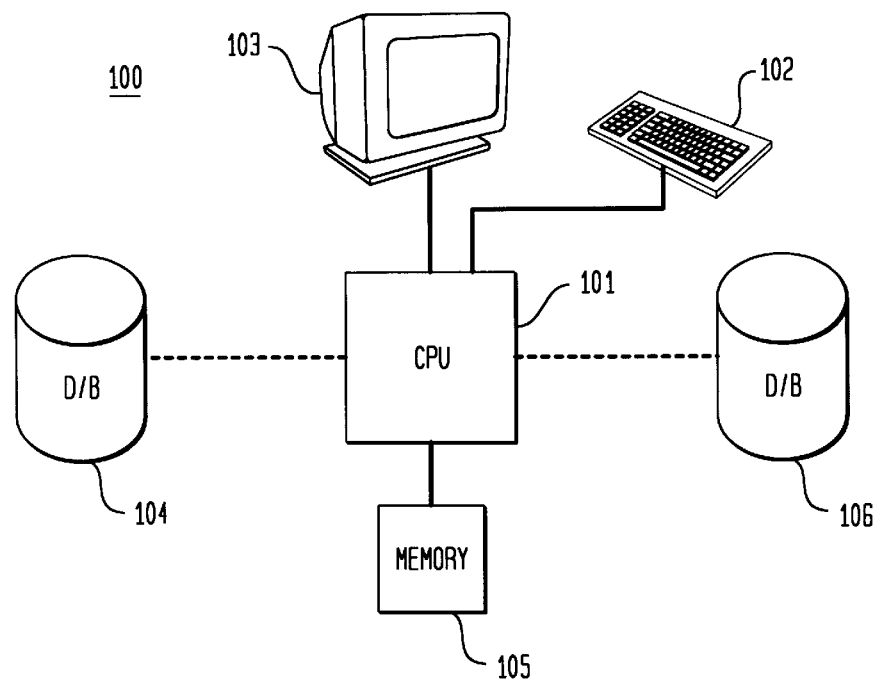
FIG. 1 shows a schematic diagram of the basic apparatus for performing the process.

The present invention may be practiced using a convention computer. A schematic diagram of a suitable computer apparatus 100 is depicted in FIG. 1. As shown, a CPU 101 is operatively connected to a user input and output means such as a keyboard 102 and a display screen 103 respectively. Additionally, the CPU 101 is operatively connected to a first storage means 104 and second storage means 206 which may be combined with one another or discrete. The storage means can be any computer readable medium such as a disk, tape, CD, RAM or PROM. In this embodiment, first storage means 104 is used by a data collection unit (not shown) as a repository for a log file containing the data packets. Once the data packets are collected, the first storage means 104 may be removed from the data collection unit and placed in the computer apparatus 100 for data organization in a relational data base stored in the second storage means 106. It should be recognized, however, that transferring data from the data collection unit to the apparatus may be performed using other conventional techniques and means for data transfer such as a modem or LAN connection. It also should be understood that the collection unit and the apparatus 100 may be integral, or operatively integral by means of a LAN, thereby obviating the need to transfer the data.

The memory 105 contains a system of instructional means for the computer 100 to organize data packets in a relational database based on data events. The system may be adapted to function on known operating platforms and is anticipated to be compatible with emerging operating platforms as well. The system may be stored on any computer readable medium such as a disk, tape, CD, RAM or PROM.

Figure 2:
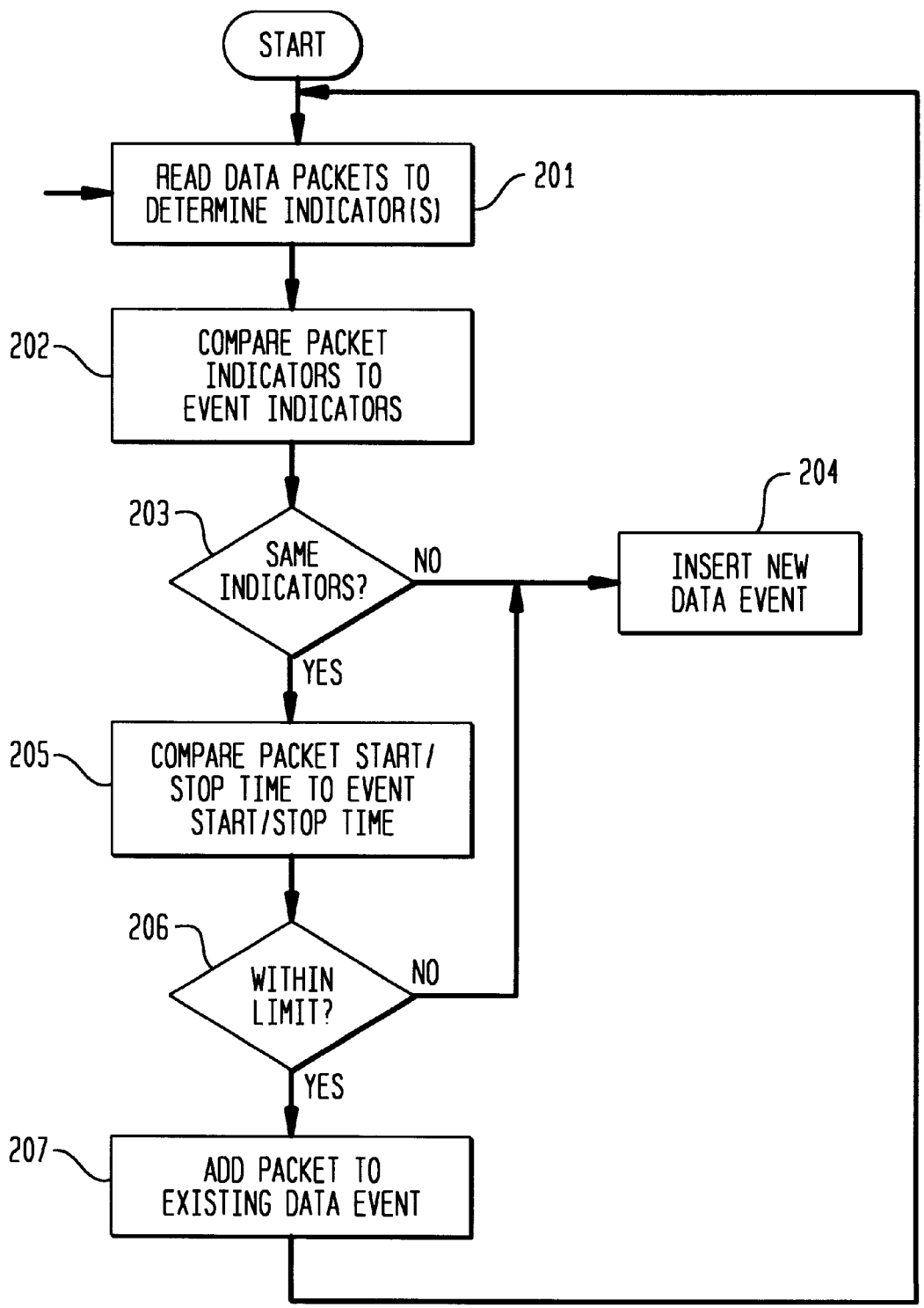
FIG. 2 shows a flow chart of a basic process embodiment of the present invention.

In one embodiment, the system enables the computer apparatus 100 to perform a simple process embodiment of the invention depicted in FIG. 2. In Block 201, a particular data packet is read and its data identifier(s) are determined along with its start and stop time. The data identifier(s) of this particular data pack are then compared, in Block 202, against the data identifier(s) of one or more data events stored in a relational database. Block 203 determines whether each of the data identifiers of this particular data packet match those of one or more data events. It should be noted that the data stored in the data event(s) are derived from data packets already organized in accordance with the process disclosed herein. If this particular data packet happens to be the first processed, however, then no comparison would be possible, and thus, no match could occur. If just one data identifier does not match, then the process proceeds to Block 204. In Block 204, the particular data packet is inserted as a new data event in the relational database.

On the other hand, if the data identifiers of the particular data packet do match those of at least one data event, then the process proceeds to Block 205. In Block 205, a comparison is made with a data event having like data identifiers to determine the difference between either the start time of the particular data packet and the stop time of the data event, or the stop time of the particular data packet and the start time of the data event. If the difference is determined by Block 206 to be beyond a predetermined limit, then the process proceeds to Block 204 as described above. If the difference is below a predetermined limit, however, then the process proceeds to Block 207. In Block 207, the particular data packet is appended to the existing data event's data by adding it to the data event in its appropriate chronological order.

In accordance with this invention, data packets are organized in a relational database based on data events. Data within a data event has the same data identifiers and is chronologically contiguous. Data organized in this fashion lends itself to relational database techniques which are well known in the art. For example, a "select" command specifying the data indicators and perhaps a time period can be used to extract data from the relational database.

Organizing data in this fashion has many applications. It is particularly well suited in applications where multiple types of data are being collected concurrently en masse and stored in a serial fashion. Suitable applications include organizing instrumentation data in continuous processes such as chemical processes and nuclear reactions. Aside from industrial applications, the invention may practiced in patient care for monitoring the vital signs of a patient, or in any other situation where multiple measurements are taken. One particular application well suited for the present invention is in the field of Code Division Multiple Access (CDMA) wireless telecommunications.

Figure 3:
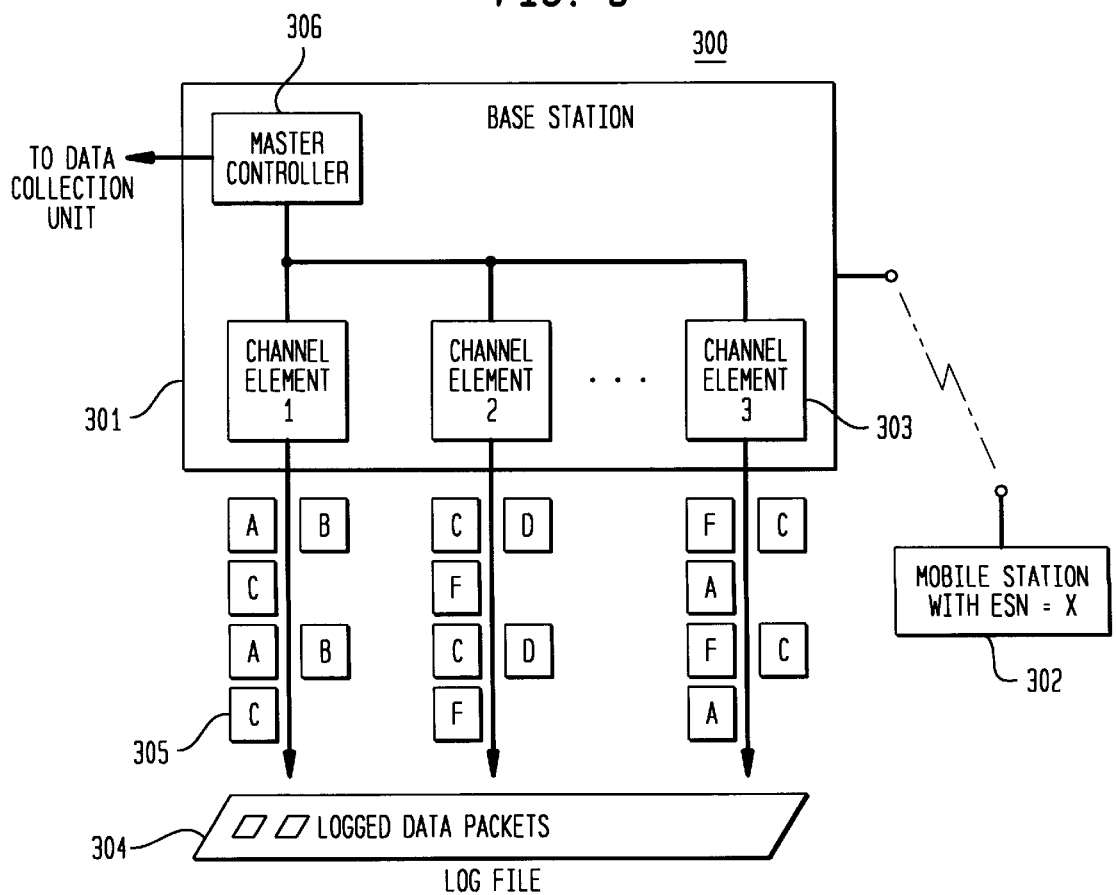
FIG. 3 shows a schematic diagram of a component in a CDMA from which data are gathered.

A CDMA wireless communication system is made up of a collection of network elements a typical example of which is shown in FIG. 3. The system comprises a group of functionally similar primary base stations 301, dispersed throughout a geographical area where wireless access is desired. Within each base station 301, exists a collection of processors known as channel elements (CE) 303 connected to a master controller 306. A channel element 303 processes the electrical signals that make up a communication channel for a given mobile station 302.

While signals are being processed during a call, various measurements and properties of the ongoing signal may be observed and recorded by an external data collection/logging unit (not shown). The data logging unit typically is releasibly connected to a port on the master controller 306 such that it is operatively connected to each channel element 303. These data collection units transfer data packets 305 containing measurements or other signal information from the channel elements 303 to binary log files 304 for post processing. Each data packet 305 collected has certain data indicators. In one particular embodiment, the data indicators may include a channel element (CE) number to indicate the channel element 303 from which the data was collected, an electronic serial number (ESN) to indicate which mobile station the signal relates to, and the type of data being obtained. Types of data include, but are not limited to, signal strength measurements, frame rate indicators, and gain settings. Each packet typically contains data representing measurements made over short periods of time (from 0.00125 to 1 or 2 seconds). It should be understood that other data indicators may be involved if other variables affect the data. For example, if multiple cell sites are being monitored, then the data indicators would also include a cell site indicator.

During a tested wireless phone call, data packets of various types are collected en masse by the data logging equipment. As each packet is logged, it is marked with a header identifying the data indicators. The final output of the data collection process is one or more binary computer files 304 containing large numbers (thousands) of these data packets in a serial form. The files are difficult to search and interpret because unrelated data packets are interposed. The present invention provides the means of organizing this information to allow for efficient searching and retrieval.

The method and system of the present invention will now be discussed as applied to CDMA wireless telecommunication system test information. It should be understood, however, that this embodiment is for illustrative purposes only and should not be used to limit the scope of the claims.

One embodiment of the process as applied to CDMA telecommunications is shown in FIG. 4. In Block 401, the data packets are collected in the manner described above and accordingly marked with data identifiers. The data identifiers of each data packet are read in Block 402. The steps of Block 401 and 402 may be performed in a continuous process using a single computer, or the data packets may be down-loaded to a computer readable storage medium and subsequently read by a computer configured to perform the process described herein. In the preferred embodiment, the data packets are collected by a dedicated data collection unit on site. This way, the data collection unit can be temporary installed on site, allowed to down-load the data, and then removed for subsequent data organization and post processing.

Once a data packet is read, Block 403 intializes a comparison loop for existing data events. In this loop, a comparison is made between the data indicators of the data packet and those of the existing data events in a relational database. In this embodiment, a data event refers to a single, specific type of data being measured on a single, specific channel element from a specific mobile station over a particular time frame. A data event therefore has the same data identifiers as data packets (i.e., CE, data type, and ESN). The data event also has a specific start and stop time. For example, if data of type A is being extracted from Channel Element CE1 for ESN1 during the period t1 to t2, then a data event is defined having data type A, CE1, ESN1, and start time=t1 and stop time=t2. If data of type B is also being collected from CE1 for ESN1 during this time period, a second data event is defined with the same start and stop times, but a data type of B. Further, if collection of A type data ceases on CE1 at t2, and then restarts after a certain duration, t3 and continues to t4, this is also a new data event. On the other hand, if collection of A type data on CE1 continues through t2 for a period of t3 to t4, then this is the same data event.

The comparison involves up to three separate determinations in this particular embodiment. A separate determination is made for each data indicator unless a mismatch is detected. As shown in FIG. 3, a determination is made in Block 404 whether the data type of the data packet is the same as that for a particular data event. If not, the process proceeds to Block 408 where another data event is considered, providing that another data event is available as determined in Block 409, and the process returns to Block 404. However, if Block 409 determines that the loop is complete and that all the data events have already been considered, then Block 410 adds a new data event to the relational database, and the data packet is placed therein. From Block 410 the process moves to Block 411 where a determination is made whether other data packets remain to be organized. The process stops if no data packets remain, otherwise, the process returns to Block 402.

Referring back to Block 404, as soon as the data type of a data event matches that of a data packet, the process proceeds to Block 405 where a determination is made whether the channel element of the data packet matches the channel element of the data event which matched in Block 404. If not, the process proceeds to Block 408 as described above. If there is a match, however, the process proceeds to Block 405 where a third determination is made whether the ESN of the data packet matches the ESN of the data event that matched in Blocks 404 and 405. The process proceeds to Block 407 if no match exists as discussed above. If a data event matches in Blocks 404, 405, and 406, then the process proceeds to Block 407.

A determination is made in Block 407 whether the data packet is contiguous in time with the data event having like data identifiers. This determination is made by comparing the start and stop times of the data packet and those of the data event. More specifically, the difference between either the event's stop time and the packet's start time, or the packet's stop time and the event's start time is calculated. This difference is then compared to a predetermined limit. The predetermined limit reflects the amount of time that can transpire between two occurrence while still being considered contiguous in time. Such tolerance is needed because data of the same indicators cannot share a common point in time. In this particular embodiment, the limit is equal to two base units of time by which the start and stop times are measured. It has been found that this limit adequately compensates for the time jitter associated with time stamping the data without including extraneous data. If the difference exceeds the predetermined limit, then the process proceeds to Block 408 as described above. If the difference is within the predetermined limit, then the process moves onto Block 412. Block 412 adds the data packet to the existing data event in its proper sequence; i.e., either before or after the existing data event. The process then proceeds to Block 411 as described above.

It should be understood that the method depicted in FIG. 4 is only illustrative of the method embodiment of the present invention and that other embodiments would be apparent to someone skilled in the art of programming. For example, the sequence of Blocks 404, 405, 406, 407 is not essential to the process, and any sequence will work. It is preferable, however, to perform those determinations which are least likely to result in a match earliest in the process. That is, since any mismatch will be dispositive of the data packet's entry in the database, the process can be short-circuited by organizing the determinations to achieve an inevitable mismatch as soon as possible. Moreover, in Blocks 404–407, rather than proceeding to the next comparison as soon as a match is determined, the process can determine all the data events that match a particular data indicator before moving to the next comparison. Other programming variances may include comparing existing data event to the data packets rather than comparing a data packet to existing data events. Still many other programming variations are possible, although it is preferred that the particular programming implemented be devised to detect a mismatch as soon as possible in the process.

Organizing data in this fashion facilitates relational database techniques. For example, post processing modules indicated by Block 413, which generally desire data of a specific type over a specific time, can easily extract the desired data via a simple Structured Query Language "Select" statement which is well known in the art. Such a Select statement need only specific the particular ESN, CE, the data type desired and optionally the time window in which data occurred. From this select statement, a pointer is returned that leads to all data satisfying the request.

Illustrative Example

In the CDMA system depicted in FIG. 3, the data packets of obtained using a data collection unit are displayed in Table 1. It should be understood that Table 1 is for demonstrative purposes and the data packets would not ordinarily be displayed in such a manner. Instead, the data would be stored in series from Packet No. 1 to Packet No. 8 in a log file.

Using the process embodiment of the present invention depicted in FIG. 4, the data packets in the log file would be processed and organized into a relational database. TABLE 2 illustrates the steps that may be performed and the decisions that may be made in sequentially organizing the data packets of TABLE 1. In this example, a time limit of 0.04 milliseconds was be used. A possible relational database for this data generated according to the present invention is shown in TABLE 3

TABLE 1

| Packet No. | Time | Channel Element (CE) | Mobile Unit (ESN) | Data type | Data Identifiers |
|---|---|---|---|---|---|
| 1 | 1.02–2 ms | 1 | 1 | frame rate | CE1-ESN1-FR |
| 2 | 1.02–2 ms | 2 | 4 | frame rate | CE2-ESN4-FR |
| 3 | 1.02–2 ms | 1 | 1 | energy | CE1-ESN1-EN |
| 4 | 2.02–4 ms | 1 | 1 | frame rate | CE1-ESN1-FR |
| 5 | 2.02–4 ms | 1 | 1 | energy | CE1-ESN1-EN |
| 6 | 4.02–6 ms | 1 | 1 | energy | CE1-ESN1-EN |
| 7 | 4.02–6 ms | 3 | 2 | energy | CE3-ESN2-EN |
| 8 | 6.02–8 ms | 1 | 1 | frame rate | CE1-ESN1-FR |

TABLE 2

| Data Packet | Data Event | Identifier Match? | | | Contiguous? | | Assignes Data Event |
|---|---|---|---|---|---|---|---|
| | | Data Type | CE | ESN | Time Delta | Within limit | |
| 1 | — | — | — | — | — | — | 1 |
| 2 | 1 | Yes | No | — | — | — | 2 |
| 3 | 1 | No | — | — | — | — | 3 |
| | 2 | No | — | — | — | — | |
| 4 | 1 | Yes | Yes | Yes | 0.02 | Yes | 1 |
| 5 | 1 | No | — | — | — | — | 3 |
| | 2 | No | — | — | — | — | |
| | 3 | Yes | Yes | Yes | 0.02 | Yes | |
| 6 | 1 | No | — | — | — | — | 3 |
| | 2 | No | — | — | — | — | |
| | 3 | Yes | Yes | Yes | 0.02 | Yes | |
| 7 | 1 | No | — | — | — | — | 4 |
| | 2 | No | — | — | — | — | |
| | 3 | Yes | No | — | — | — | |

TABLE 2-continued

| Data Packet | Data Event | Identifier Match? | | | Contiguous? | | Assignes Data Event |
| | | Data Type | CE | ESN | Time Delta | Within limit | |
|---|---|---|---|---|---|---|---|
| 8 | 1 | Yes | Yes | Yes | 2.02 | No | 5 |
|   | 2 | Yes | No  | —   | —    | —  |   |
|   | 3 | No  | —   | —   | —    | —  |   |
|   | 4 | No  | —   | —   | —    | —  |   |

TABLE 3

| Data event | Data Indicators | start time | stop time | Pointer |
|---|---|---|---|---|
| 1 | CE1-ESN1-FR | 1.02 ms | 4.00 ms | DE 1 |
| 2 | CE2-ESN4-FR | 1.02 ms | 2.00 ms | DE 2 |
| 3 | CE1-ESN1-EN | 1.02 ms | 6.00 ms | DE 3 |
| 4 | CE3-ESN2-EN | 4.02 ms | 6.00 ms | DE 4 |
| 5 | CE1-ESN1-FR | 6.02 ms | 8.00 ms | DE 5 |

Obviously, numerous modifications and variations of the present invention are possible in the light of the above teachings. It is therefore understood that within the scope of the appended claims, the invention may be practiced otherwise than as specifically described herein.

What is claimed is:

1. A method for organizing data packets within a relational database, said relational database containing at least one data event, each data event having a start time, a stop time, and at least one data indicator, said method comprising the steps of:

reading a data packet having a packet start time, a packet stop time, and at least one packet data indicator;

comparing said data packet to at least one data event of said relational database to determine whether said data packet complements a data event such that each packet data indicator matches each data indicator of said data event and the difference between either the stop time of said data event and said packet start time or said packet stop time and the start time of said data event does not exceed a certain limit; and assigning said data packet to one of the following:
an existing data event in said relation data base if said data packet complements said existing data event; otherwise,
a new data event in said relational database.

2. The method of claim 1, further comprising:
extracting data from said relational database using a select statement that specifies said data indicators.

3. The method of claim 1, further comprising:
gathering said data packets and marking each data packet with a start and stop time and with a sufficient number of data indicators to distinguish said data packet from all other data packets.

4. The method of claim 1, wherein said data packets relate to measurements gathered in a telecommunications network, said telecommunication network having a base station and at least one terminal wherein said base station and said terminal transmit a signal therebetween, said base station having at least one channel element (CE) for processing said signal, said data packet having data indicators indicating at least type of data, CE source, secondary base station source (ESN).

5. The method of claim 4, wherein said certain limit is substantially the same as two base units of time used to measure the stop and start times.

6. An apparatus for organizing data packets within a relational database, said relational database containing at least one data event, each data event having a start time, a stop time, and at least one data indicator, said apparatus comprising:

means for reading a data packet;

means for determining a packet start time, a packet stop time, and each packet data indicator for said data packet; and means for comparing said data packet to at least one data relational database to determine whether said data packet complements a data event such that each packet data indicator matches each data indicator of said data event and the difference between either the stop time of said data event and said packet start time or said packet stop time and the start time of said data event does not exceed a certain limit; and means for assigning said data packet to one of the following:
an existing data event in said relational database if said data packet complements said existing data event; otherwise,
a new data event in said relational database.

7. The apparatus of claim 6, further comprising:

means for extracting data from said relational database se using a select statement that specifies said data indicators.

8. The apparatus of claim 6, further comprising:

gathering said data packets and marking each data packet with a start and stop time and with a sufficient number of data indicators to distinguish said data packet from the other data packets.

9. The apparatus of claim 6, wherein said data packets relate to measurements gathered in a telecommunications network, said telecommunication network having a base station and at least one terminal wherein said base station and terminal transmit a signal therebetween, said base station having at least one channel element (CE) for processing said signal, said data packet having data indicators indicating type of data, CE source, secondary base station source (ESN).

10. The apparatus of claim 9, wherein said certain limit is substantially the same as two base units of time used to measure the stop and start times.

11. The apparatus of claim 9, wherein said means for reading said data packets involves reading a computer readable medium containing a serial file of said data packets.

12. An apparatus for organizing data packets within a relational database, said relational database, containing at least one data event, each data event having a start time, a stop time, and at least one data indicator, said apparatus comprising:

a microprocessor;

user input and output means operatively connected to said microprocessor;

a first computer readable storage means operatively connected to said microprocessor;

a second computer readable storage means operatively connected to said microprocessor;

memory operatively connected to said microprocessor, said memory containing instructional means for performing the following steps:
reading a data packet from said first storage means;
determining a packet start time, a packet stop time, and each packet data indicator for said data packet; and comparing said data packet to at least one data event of said relational database to determine whether said data packet complements a data event such that each packet data indicator matches each at a indicator of said data event and the difference between either the stop time of said data event and said packet start time or said packet stop time and the start time of said data event does not exceed a certain limit; and assigning said data packet to one of the following:
an existing data event in said relational database if said data packet complement said existing data event; otherwise,
a new data event in said relational database.

13. The apparatus of claim 12, wherein said data packets relate to measurements gathered in a telecommunications network, said telecommunication network having a base station and at least one terminal wherein said base station and said terminal transmit a signal therebetween, said base station having at least one channel element (CE) for processing said signal, said data packet having data indicators indicating at least type of data, CE source, secondary base station source (ESN).

14. A system for organizing data packets within a relational database, said relational database containing at least one data event, each data event having a start time, a stop time, and at least one data indicator, said system comprising instructional means for:

reading a data packet;

determining a packet start time, a packet stop time, and each packet data indicator for said data packet; and comparing said data packet to at least one data event of said relational database to determine whether said data packet complements a data event such that each packet data indicator matches each data indicator of said data event and the difference between either the stop time and the start time of said data event does not exceed a certain limit; and assigning said data packet to one of the following:
an existion data event in said relational database if said data packet complements said existing data event; otherwise,
a new data event in said relational database.

15. The system of claim 14, further comprising instructional means for:

extracting data from said relational database using a select statement that specifies said data indicators.

16. The system of claim 14, wherein said data packets relate to measurements gathered in a telecommunications network, said telecommunication network having a base station and at least one terminal wherein said base station and terminal transmit a signal therebetween, said base station having at least one channel element (CE) for processing said signal, said data packet having data indicators indicating type of data, CE source, secondary base station source (ESN).

17. The system of claim 16, wherein said certain limit is substantially the same as two base units of time used to measure the stop and start times.

* * * * *